United States Patent
Smith et al.

(10) Patent No.: US 12,179,910 B2
(45) Date of Patent: Dec. 31, 2024

(54) SYSTEM ARCHITECTURE FOR OPERATION OF AIRCRAFT FLAPS

(71) Applicant: Goodrich Actuation Systems Limited, Solihull (GB)

(72) Inventors: Paul Smith, Broseley (GB); Peter William Bacon, Wolverhampton (GB); Maamar Benarous, Coventry (GB)

(73) Assignee: GOODRICH ACTUATION SYSTEMS LIMITED, West Midlands (GB)

( * ) Notice: Subject to any disclaimer, the term of this patent is extended or adjusted under 35 U.S.C. 154(b) by 127 days.

(21) Appl. No.: 17/973,870

(22) Filed: Oct. 26, 2022

(65) Prior Publication Data
US 2023/0133000 A1 May 4, 2023

(30) Foreign Application Priority Data
Nov. 3, 2021 (EP) .................................... 21275155

(51) Int. Cl.
*B64C 13/50* (2006.01)
*B64C 9/06* (2006.01)
*H02P 5/74* (2006.01)

(52) U.S. Cl.
CPC ............... *B64C 13/50* (2013.01); *B64C 9/06* (2013.01); *H02P 5/74* (2013.01)

(58) Field of Classification Search
CPC .. B64C 13/50; B64C 9/06; B64C 9/16; B64C 13/505; B64C 9/18; B64C 9/20;
(Continued)

(56) References Cited

U.S. PATENT DOCUMENTS 6,402,259 B2    6/2002  Corio et al.
7,872,367 B2 *  1/2011  Recksiek ................. G05B 9/03
                                                        307/19
(Continued)

FOREIGN PATENT DOCUMENTS

EP        1739009 A1    1/2007
JP     2009067077 A     4/2009
(Continued)

OTHER PUBLICATIONS

Abstract for JP2009067077, Published: Apr. 2, 2009, 1 page.
(Continued)

*Primary Examiner* — Medhat Badawi
*Assistant Examiner* — Vicente Rodriguez
(74) *Attorney, Agent, or Firm* — CANTOR COLBURN LLP

(57) ABSTRACT

A system architecture for operation of aircraft flaps. The system architecture includes a first pair of motor drive units, the first pair comprising a first motor drive unit (MD1) and a second motor drive unit (MD3), and a second pair of motor drive units, the second pair comprising a third motor drive unit (MD2) and a fourth motor drive unit (MD4). The system further includes a first plurality of switches connected between the first motor drive unit (MD1) and the second motor drive unit (MD3), the first plurality of switches configured to operate a first electric motor and a second electric motor, and a second plurality of switches connected between the third motor drive unit (MD2) and the fourth motor drive unit (MD4), the second plurality of switches configured to operate a third electric motor and a fourth electric motor.

12 Claims, 6 Drawing Sheets

(58) Field of Classification Search
CPC ... B64C 13/0425; B64C 13/42; B64C 13/341; H02P 5/74
See application file for complete search history.

(56) References Cited

U.S. PATENT DOCUMENTS

| | | |
|---|---|---|
| 9,227,608 B2 | 1/2016 | Hill et al. |
| 9,611,035 B2 | 4/2017 | Jordanidis et al. |
| 9,771,164 B2 | 9/2017 | Rozman et al. |
| 11,155,341 B2 * | 10/2021 | Wilkens ................ B64C 13/503 |
| 2003/0127569 A1 * | 7/2003 | Bacon .................. B64C 13/505 |
| | | 244/195 |
| 2010/0070150 A1 | 3/2010 | May |
| 2017/0283039 A1 | 10/2017 | McCormick et al. |
| 2020/0079497 A1 * | 3/2020 | Huynh ................. B64C 13/505 |
| 2020/0079514 A1 | 3/2020 | Latulipe et al. |
| 2020/0156766 A1 * | 5/2020 | Tzabari .................... B64C 9/02 |
| 2020/0290742 A1 | 9/2020 | Kumar et al. |
| 2022/0212782 A1 * | 7/2022 | Huynh ..................... B64C 9/20 |

FOREIGN PATENT DOCUMENTS

| | | |
|---|---|---|
| WO | 2007002311 A1 | 1/2007 |
| WO | 2020176405 A1 | 9/2020 |

OTHER PUBLICATIONS

Benarous, et al. "Flap system power drive unit (PDU) architecture optimisation", The Journal of Engineering, The 9th International Conference on Power Electronics, Machines and Drives (PEMD 2018), J. Eng., 2019, vol. 2019, Iss. 17, pp. 3500-3504.
European Search Report for Application No. 21275155.6, mailed Apr. 11, 2022, 15 pages.

\* cited by examiner

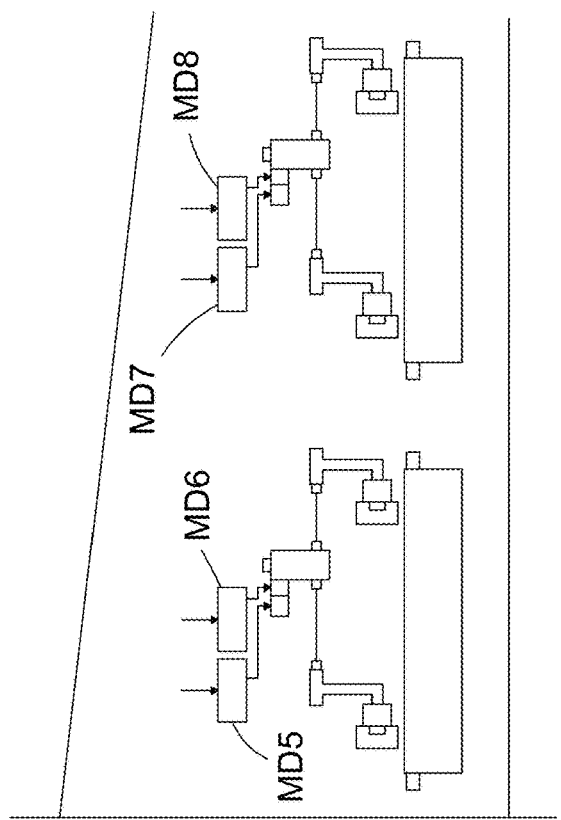
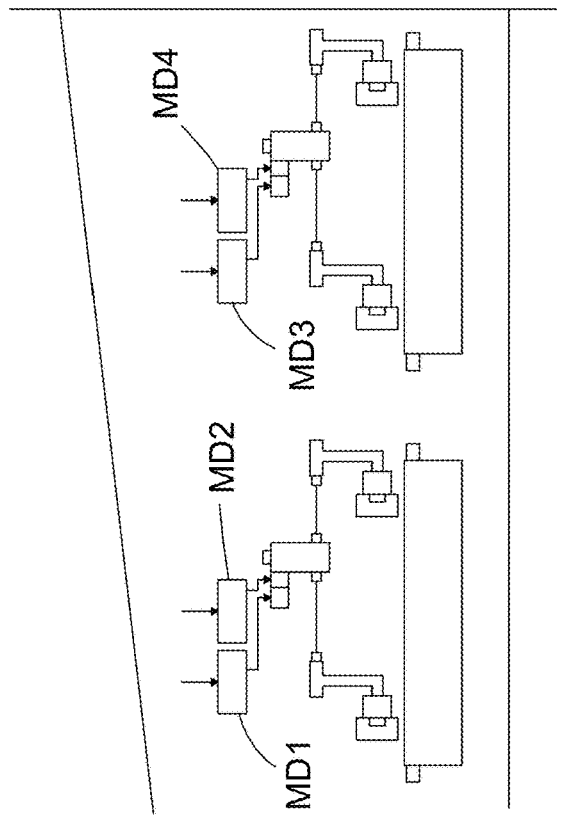
FIG. 1 - PRIOR ART

SYSTEM ARCHITECTURE FOR OPERATION OF AIRCRAFT FLAPS

CROSS-REFERENCE TO RELATED APPLICATIONS

This application claims priority to European Patent Application No. 21275155.6 filed Nov. 3, 2021, the entire contents of which is incorporated herein by reference.

FIELD

The present disclosure relates to system architecture for an aircraft. In particular, the present disclosure related to a system electrical architecture for operation of aircraft flaps.

BACKGROUND

Individual flap panels on aircraft wings require two motor drive units to operate the individual flap panels. Therefore, eight motor drive units are required per aircraft in order to ensure all flap panels can be operated in the event of electronic failures.

SUMMARY

There is provided a system architecture for operation of aircraft flaps. The system architecture includes a first pair of motor drive units, the first pair comprising a first motor drive unit and a second motor drive unit, and a second pair of motor drive units, the second pair comprising a third motor drive unit and a fourth motor drive unit. The system architecture further includes a first plurality of switches connected between the first motor drive unit and the second motor drive unit, said first plurality of switches configured to operate a first electric motor and a second electric motor, and a second plurality of switches connected between the third motor drive unit and the fourth motor drive unit, said second plurality of switches configured to operate a third electric motor and a fourth electric motor.

The first motor drive unit and the second motor drive unit may be connected in series, and the first plurality of switches may include a first switch, a second switch, a third switch and a fourth switch. The first switch and the second switch may be arranged in parallel with the third switch and the fourth switch. The first electric motor may be connected between the first switch and the second switch, and the second motor may be connected between the third switch and the fourth switch. The first electric motor may further be configured to operate a left hand outboard flap panel and the second electric motor may be configured to operate a left hand inboard flap panel.

The third motor drive unit and the fourth motor drive unit may be connected in series, and the second plurality of switches may include a fifth switch, a sixth switch, a seventh switch and an eighth switch. The fifth switch and the sixth switch may be arranged in parallel with the seventh switch and the eighth switch. The third electric motor may be connected between the fifth switch and the sixth switch, and the fourth motor may be connected between the seventh switch and the eighth switch. The third electric motor may be configured to operate a right hand inboard flap panel and the fourth electric motor may be configured to operate a right hand outboard flap panel.

There is also provided an aircraft that includes a left hand outboard flap panel, a left hand inboard flap panel, a right hand inboard flap panel, and a right hand outboard flap panel. The aircraft also includes the system architecture as described above. The first electric motor may be configured to operate a left hand outboard flap panel and the second electric motor may be configured to operate a left hand inboard flap panel. The third electric motor may be configured to operate a right hand inboard flap panel and the fourth electric motor may be configured to operate a right hand outboard flap panel.

There is further provided a method of operation of aircraft flaps. The method includes providing a first pair of motor drive units, the first pair comprising a first motor drive unit and a second motor drive unit, providing a second pair of motor drive units, the second pair comprising a third motor drive unit and a fourth motor drive unit, providing a first plurality of switches connected between the first motor drive unit and the second motor drive unit, said first plurality of switches configured to operate a first electric motor and a second electric motor, and providing a second plurality of switches connected between the third motor drive unit and the fourth motor drive unit, said second plurality of switches configured to operate a third electric motor and a fourth electric motor.

BRIEF DESCRIPTION OF THE DRAWINGS

FIG. 1 shows an example of an ordinary system architecture for a distributed lift system of an aircraft and operation of aircraft flaps.

DETAILED DESCRIPTION

FIG. 1 shows an example of an ordinary system architecture for operation of aircraft flaps. As can be seen in FIG. 1, there are provided two motor drive units for each flap panel. For example, on the left hand side wing of the aircraft, there is provided an outboard flap panel (flap panel 2) with two motor drive units MD1 and MD2 to operate the left hand side outboard flap panel. There is also provided a left hand side inboard flap panel (flap panel 1) with two motor drive units MD3 and MD4 to operate the left hand side inboard flap panel. On the right hand side wing, there is provided a right hand side inboard panel (flap panel 1) with a further two motor drive units MD5 and MD6 to operate the right hand side inboard flap panel. There is also provided a right hand side outboard flap panel (flap panel 2) with a further two motor drive units MD7 and MD8 to operate the right hand side outboard flap panel. As an example, each flap panel is operated by two motor drive units, which results in a total of eight motor drive units along the wings to operate the four flap panels. This is expensive and weighty for an aircraft. Further, if there is a failure in the motor drive units, there is a risk that the flap panels will not operate at all. For example, if MD3 and MD4 fail, the left hand side inboard flap panel will not operate, which can lead to consequences for the flight crew.

Figure 2A:
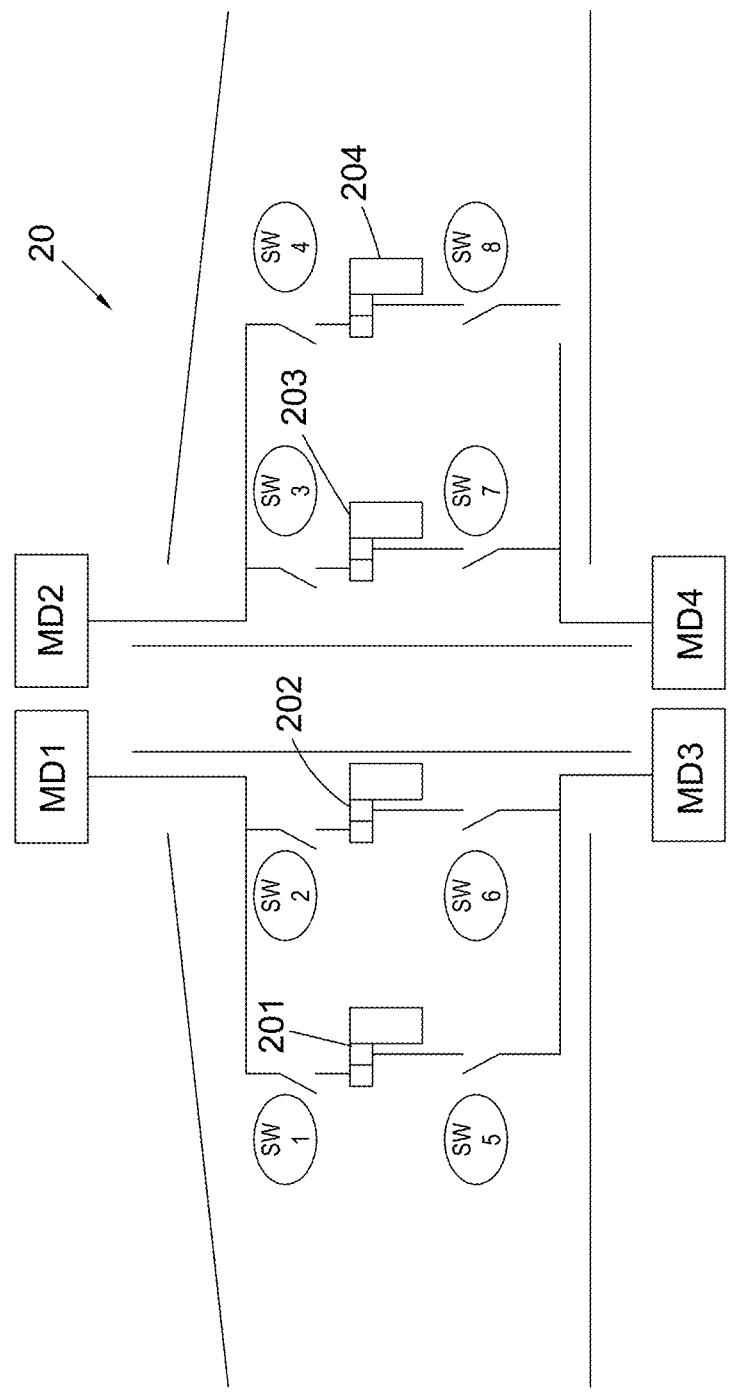
FIG. 2a shows an example of a system architecture in accordance with this disclosure.

FIG. 2a shows a system architecture 20 in accordance with the present disclosure. The system architecture 20 generally allows for fail safe mechanisms during operation of the flap panels. As shown in FIG. 2a, there may be provided a first motor drive unit MD1 connected in series with a second motor drive unit MD3. Connected between the first motor drive unit MD1 and second motor drive unit MD3 is a plurality of switches SW1, SW2, SW5 and SW6. As shown in FIG. 2a, a first switch SW1 and a second switch SW5 are in parallel with a third switch SW2 and a fourth switch SW6, and all of these switches SW1, SW2, SW5, SW6 are connected to the first motor drive unit MD1 and the second motor drive unit MD3. A first electric motor 201 for operation of a left hand outboard flap panel is shown connected between the first and second switches SW1 and SW5. A second electric motor 202 for operation of a left hand inboard flap panel is shown connected between the third and fourth switches SW2 and SW6. All of the first, second, third and fourth switches SW1, SW5, SW2 and SW6 are shown to be open.

As shown in FIG. 2a, there may be provided a third motor drive unit MD2 connected in series with a fourth motor drive unit MD4. Connected between the third motor drive unit MD2 and fourth motor drive unit MD4 is a plurality of switches SW3, SW4, SW7 and SW8. As shown in FIG. 2a, a fifth switch SW3 and a sixth switch SW7 are in parallel with a seventh switch SW4 and an eighth switch SW8, and all of these switches SW3, SW4, SW7, SW8 are connected to the third motor drive unit MD2 and the fourth motor drive unit MD4. A third electric motor 203 for operation of a right hand inboard flap panel is shown connected between the fifth and sixth switches SW3 and SW7. A fourth electric motor 204 for operation of a right hand outboard flap panel is shown connected between the seventh and eighth switches SW4 and SW8. All of the fifth, sixth, seventh and eighth switches SW3, SW7, SW4 and SW8 are shown to be open.

In the example shown in FIG. 2a, all of the flap panels can be controlled by a system architecture that has only four motor drive units.

Figure 2B:
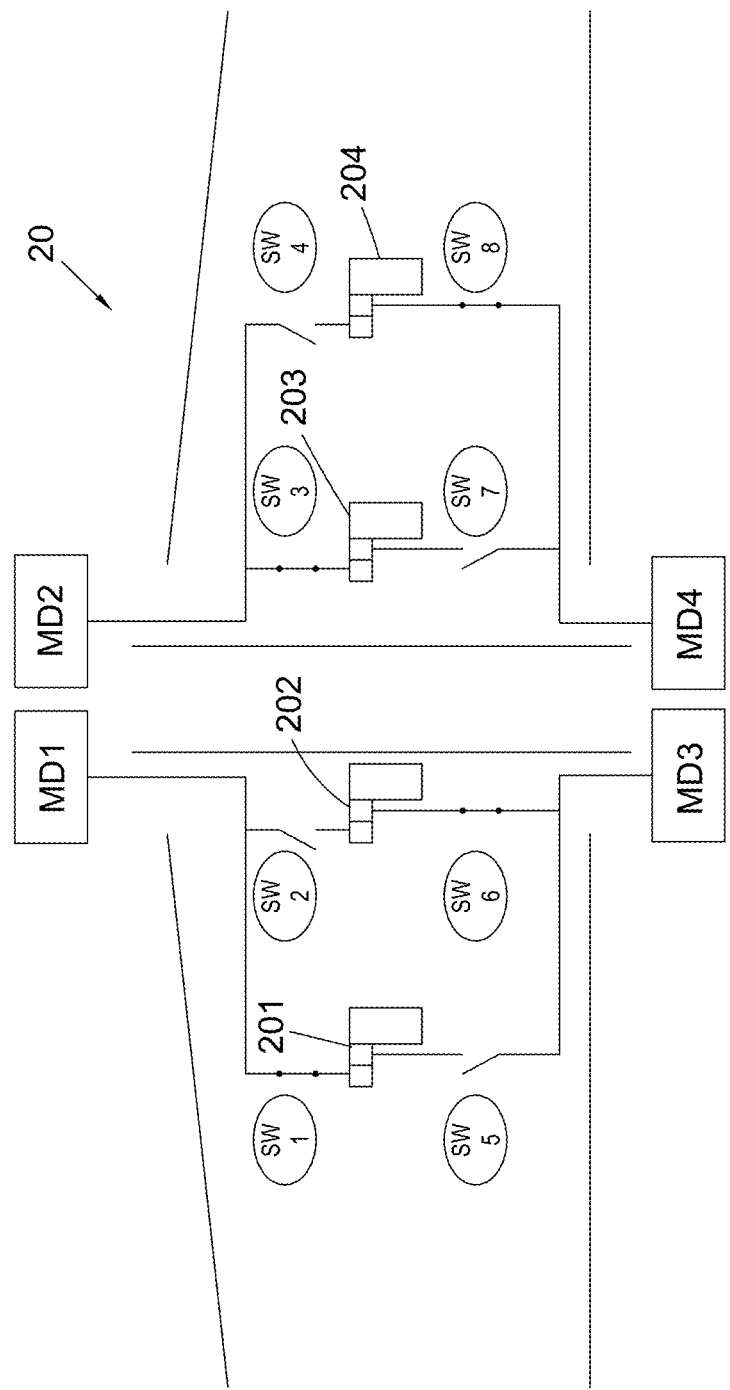
FIG. 2b shows an example of the system architecture of FIG. 2a in use.

FIG. 2b shows an example of the system architecture of FIG. 2a during a safe operation. As can be seen in FIG. 2b, the first switch SW1 and the fourth switch SW6 are closed such that the first motor drive unit MD1 and second motor drive unit MD3 can operate the electric motors 201 and 202. Therefore, the first motor drive unit MD1 and the second motor drive unit MD3 are able to operate the left hand side inboard and outboard flap panels. Similarly, the fifth switch SW3 and the eighth switch SW8 are closed such that the third motor drive unit MD2 and fourth motor drive unit MD4 can operate the electric motors 203 and 204. Therefore, the third motor drive unit MD2 and the fourth motor drive unit MD4 are able to operate the right hand side inboard and outboard flap panels.

Figure 2C:
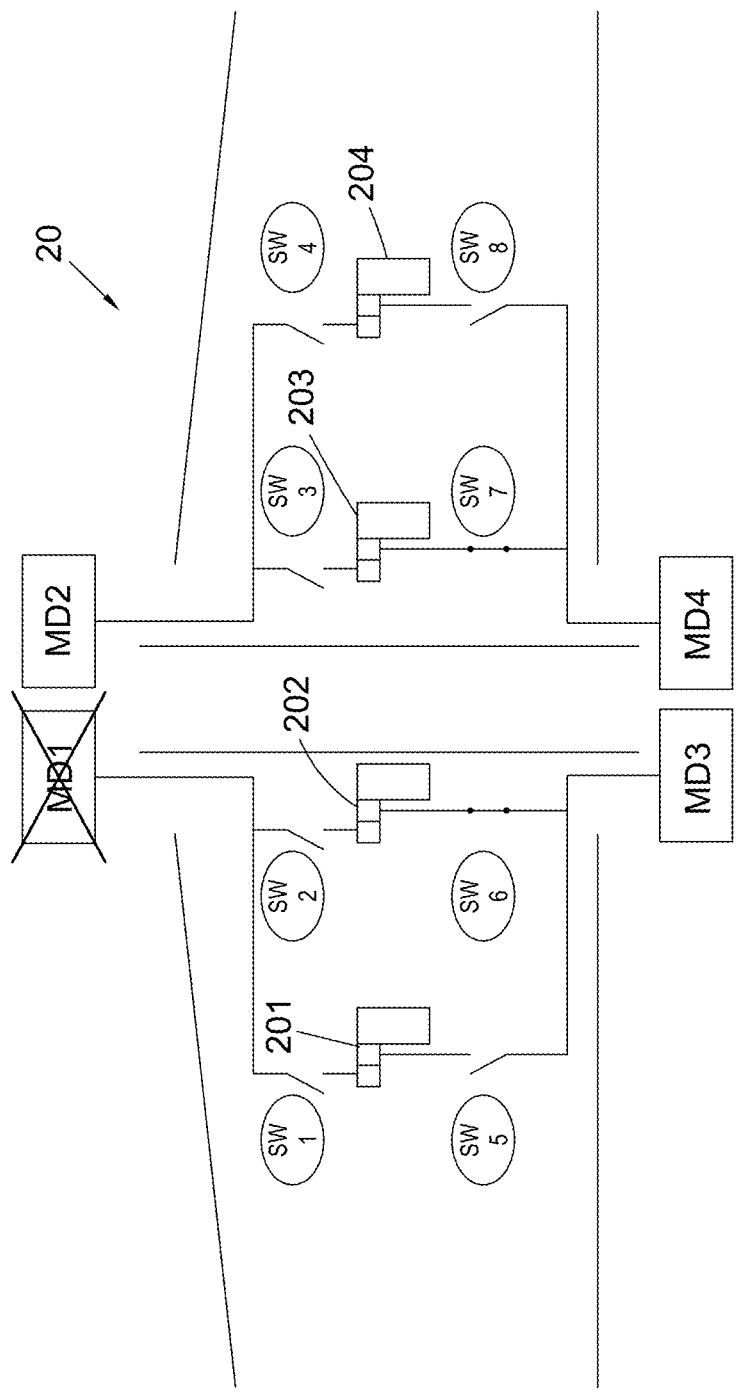
FIG. 2c shows an example of the system architecture of FIG. 2a during a failure.

FIG. 2c shows an example of the system architecture of FIG. 2a during a failure event in which the left hand side inboard panel and right hand side inboard panel can operate as normal. As an example shown in FIG. 2c, the first motor drive unit MD1 has failed. As can be seen in FIG. 2c, the left hand inboard flap panel can be operated by closing the fourth switch SW6 and operating the second electric motor 202 for the left hand inboard flap panel via the second motor drive unit MD3. The right hand side inboard flap panel is unaffected by the failure of the first motor drive unit MD1 and, as shown in FIG. 2c, the sixth switch SW7 can be closed so as to operate the third electric motor 203 for the right hand inboard flap panel.

Figure 2D:
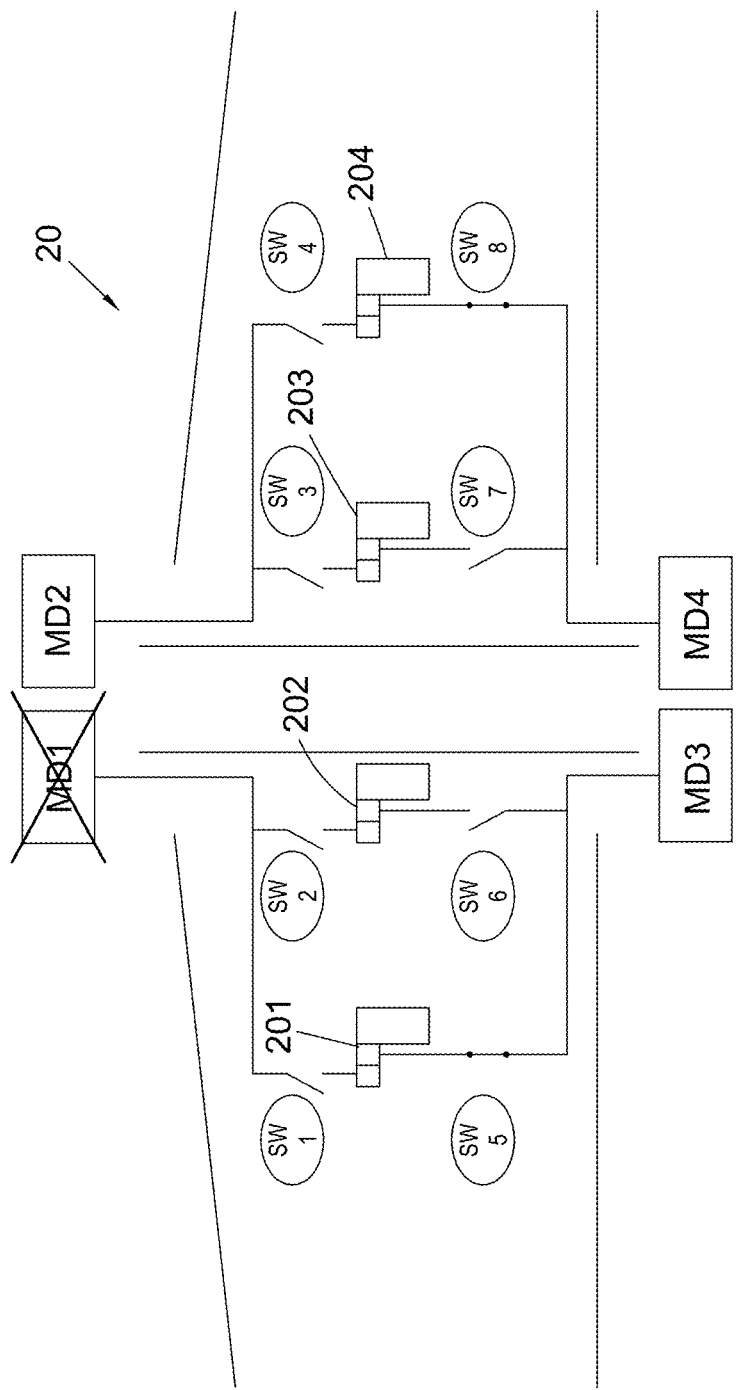
FIG. 2d shows an example of the system architecture of FIG. 2a during the failure.

FIG. 2d shows an example of the system architecture of FIG. 2a during a failure event in which the left hand side outboard panel and right hand side outboard panel can operate as normal. As an example shown in FIG. 2d, the first motor drive unit MD1 has failed. As can be seen in FIG. 2d, the left hand outboard flap panel can be operated by closing the second switch SW5 and operating the first electric motor 201 for the left hand outboard flap panel via the second motor drive unit MD3. The right hand side outboard flap panel is unaffected by the failure of the first motor drive unit MD1 and, as shown in FIG. 2d, the eighth switch SW8 can be closed so as to operate the fourth electric motor 204 for the right hand outboard flap panel.

Figure 2E:
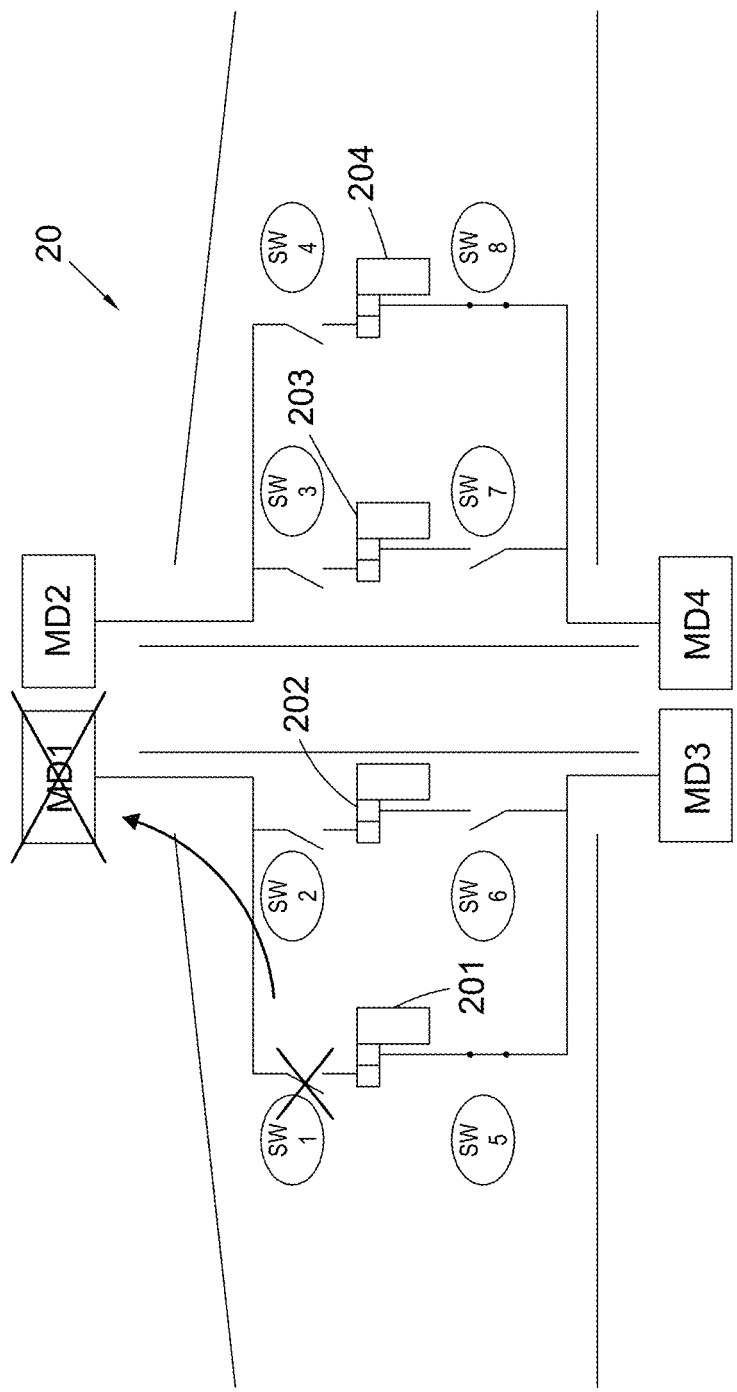
FIG. 2e shows an example of the system architecture of FIG. 2a during a further failure.

FIG. 2e shows an example of the system architecture of FIG. 2a during a failure event in which the left hand side outboard panel and right hand side outboard panel can operate as normal. As an example shown in FIG. 2e, the first motor drive unit MD1 and the first switch SW1 have failed. As can be seen in FIG. 2e, the left hand outboard flap panel can be operated by closing the second switch SW5 and operating the first electric motor 201 for the left hand outboard flap panel via the second motor drive unit MD3. The right hand side outboard flap panel is unaffected by the failure of the first motor drive unit MD1 and the first switch SW1, and as shown in FIG. 2e, the eighth switch SW8 can be closed so as to operate the fourth electric motor 204 for the right hand outboard flap panel.

The examples of failures shown in FIGS. 2c to 2e are merely examples. It is understood that if the second motor drive unit MD3 fails, then the first motor drive unit MD1 could operate the inboard and outboard flap panels by closing the first and third switches SW1 and SW2 to operate the first and second electric motors 201 and 202. Similarly, if the third motor drive unit MD2 fails, the fourth motor drive unit MD4 can operate the inboard and outboard flap panels by closing the sixth and eighth switches SW7 and SW8 to operate the third and fourth electric motors 203 and 204. If any of the switches fail, as an example, the current could be re-routed to drive any of the electric motors from the pairs of motor drive units (e.g. motor drive units MD1 and MD3 as one pair and MD2 and MD4 as another pair).

Likewise, if there are more than one failure in the system, the system architecture provides for an electrical routing for the flaps to be operated. For example, if the first motor drive unit MD1 and the third motor drive unit MD2 both fail, the second motor drive unit MD3 and the fourth motor drive unit MD4 may operate the switches. For example, the second motor drive unit MD3 may operate the second switch SW5 and fourth switch SW6 and the fourth motor drive unit MD4 may operate the sixth switch SW7 and the eighth switch SW8. Therefore, the inboard and outboard flap panels may still be operated even in the event of a dual failure of motor drive units.

Reducing the number of motor drive units required in operations of flap panels for aircraft from eight to four significantly reduces the complexity and weight of the system architecture, and provides a fail-safe mechanism should one or more motor drive units fail during flight by utilising switches within the system architecture.

Although this disclosure has been described in terms of preferred examples, it should be understood that these examples are illustrative only and that the claims are not limited to those examples. Those skilled in the art will be able to make modifications and alternatives in view of the disclosure which are contemplated as falling within the scope of the appended claims.

The invention claimed is:

1. A system architecture for operation of aircraft flaps, the system architecture comprising:

a first pair of motor drive units, the first pair comprising a first motor drive unit (MD1) and a second motor drive unit (MD3) connected in series;

a second pair of motor drive units, the second pair comprising a third motor drive unit (MD2) and a fourth motor drive unit (MD4);

a first plurality of switches connected between the first motor drive unit (MD1) and the second motor drive unit (MD3), said first plurality of switches configured to operate a first electric motor and a second electric motor, wherein the first plurality of switches comprises a first switch (SW1), a second switch (SW5), a third switch (SW2) and a fourth switch (SW6), and wherein the first switch (SW1) and the second switch (SW5) are arranged in parallel with the third switch (SW2) and the fourth switch (SW6); and a second plurality of switches connected between the third motor drive unit (MD2) and the fourth motor drive unit (MD4), said second plurality of switches configured to operate a third electric motor and a fourth electric motor;

wherein the first electric motor (201) is connected to the first switch (SW1) and to the second switch (SW5), and wherein the second motor (202) is connected to the third switch (SW2) and to the fourth switch (SW6).

2. The system architecture of claim 1, wherein the first electric motor is configured to operate a left hand outboard flap panel, and wherein the second electric motor is configured to operate a left hand inboard flap panel.

3. The system architecture of claim 1, wherein the third motor drive unit (MD2) and the fourth motor drive unit (MD4) are connected in series, and wherein the second plurality of switches comprises a fifth switch (SW3), a sixth switch (SW7), a seventh switch (SW4) and an eighth switch (SW8).

4. The system architecture of claim 3, wherein the fifth switch (SW3) and the sixth switch (SW7) are arranged in parallel with the seventh switch (SW4) and the eighth switch (SW8).

5. The system architecture of claim 4, wherein the third electric motor is connected between the fifth switch (SW3) and the sixth switch (SW7), and wherein the fourth motor is connected to the seventh switch (SW4) and to the eighth switch (SW8).

6. The system architecture of claim 5, wherein the third electric motor is configured to operate a right hand inboard flap panel and wherein the fourth electric motor is configured to operate a right hand outboard flap panel.

7. An aircraft comprising:
a left hand outboard flap panel;
a left hand inboard flap panel;
a right hand inboard flap panel;
a right hand outboard flap panel;
the system architecture of claim 1, wherein the first electric motor is configured to operate a left hand outboard flap panel and wherein the second electric motor is configured to operate a left hand inboard flap panel; and wherein the third electric motor is configured to operate a right hand inboard flap panel and wherein the fourth electric motor is configured to operate a right hand outboard flap panel.

8. A method of operation of aircraft flaps, the method comprising:
providing a first pair of motor drive units, the first pair comprising a first motor drive unit (MD1) and a second motor drive unit (MD3);

providing a second pair of motor drive units, the second pair comprising a third motor drive unit (MD2) and a fourth motor drive unit (MD4);

providing a first plurality of switches connected between the first motor drive unit (MD1) and the second motor drive unit (MD3), said first plurality of switches configured to operate a first electric motor and a second electric motor;

providing a second plurality of switches connected between the third motor drive unit (MD2) and the fourth motor drive unit (MD4), said second plurality of switches configured to operate a third electric motor and a fourth electric motor;

wherein the first motor drive unit (MD1) and the second motor drive unit (MD3) are connected in series, and wherein the first plurality of switches comprises a first switch (SW1), a second switch (SW5), a third switch (SW2) and a fourth switch (SW6);

wherein the first switch (SW1) and the second switch (SW5) are arranged in parallel with the third switch (SW2) and the fourth switch (SW6); and wherein the first electric motor is connected to the first switch (SW1) and to the second switch (SW5), and wherein the second motor is connected to the third switch (SW2) and to the fourth switch (SW6).

9. The method of claim 8,
wherein the third motor drive unit (MD2) and the fourth motor drive unit (MD4) are connected in series, and wherein the second plurality of switches comprises a fifth switch (SW3), a sixth switch (SW7), a seventh switch (SW4) and an eighth switch (SW8).

10. The method of claim 9,
wherein the fifth switch (SW3) and the sixth switch (SW7) are arranged in parallel with the seventh switch (SW4) and the eighth switch (SW8).

11. The method of claim 10,
wherein the third electric motor is connected to the fifth switch (SW3) and to the sixth switch (SW7), and wherein the fourth motor is connected to the seventh switch (SW4) and the to eighth switch (SW8).

12. The method of claim 11, wherein the first electric motor is configured to operate a left hand outboard flap panel and wherein the second electric motor is configured to operate a left hand inboard flap panel; or wherein the third electric motor is configured to operate a right hand inboard flap panel and wherein the fourth electric motor is configured to operate a right hand outboard flap panel.

* * * * *